(12) United States Patent
Birsan et al.

(10) Patent No.: US 12,105,797 B2
(45) Date of Patent: Oct. 1, 2024

(54) DEVICES, SYSTEMS, AND METHODS FOR STANDARDIZING AND STREAMLINING THE DEPLOYMENT OF SECURITY INFORMATION AND EVENT MANAGEMENT ARTIFACTS FOR MULTIPLE TENANTS

(71) Applicant: BlueVoyant LLC, New York, NY (US)

(72) Inventors: Dorian Birsan, Ontario (CA); Marius Mocanu, Ontario (CA); Igor Bologan, Bucharest (RO)

(73) Assignee: BlueVoyant LLC, New York, NY (US)

( * ) Notice: Subject to any disclaimer, the term of this patent is extended or adjusted under 35 U.S.C. 154(b) by 0 days.

(21) Appl. No.: 18/563,447

(22) PCT Filed: Jun. 3, 2022

(86) PCT No.: PCT/US2022/072743
§ 371 (c)(1),
(2) Date: Nov. 22, 2023

(87) PCT Pub. No.: WO2022/256833
PCT Pub. Date: Dec. 8, 2022

(65) Prior Publication Data
US 2024/0241947 A1    Jul. 18, 2024

Related U.S. Application Data

(60) Provisional application No. 63/196,991, filed on Jun. 4, 2021.

(51) Int. Cl.
*H04L 29/06*     (2006.01)
*G06F 21/55*     (2013.01)
*H04L 9/40*      (2022.01)

(52) U.S. Cl.
CPC ............ *G06F 21/552* (2013.01); *H04L 63/20* (2013.01)

(58) Field of Classification Search
CPC ..... G06F 21/552; G06F 21/554; H04L 63/10; H04L 63/104; H04L 63/0263; H04L 63/20
(Continued)

(56) References Cited

U.S. PATENT DOCUMENTS 11,159,576 B1 * 10/2021 Ly .................... H04L 63/0245
2015/0310195 A1 * 10/2015 Bailor .................. G06F 21/45
726/6

(Continued)

FOREIGN PATENT DOCUMENTS

| WO | 2016138067 A1 | 9/2016 |
| WO | 2017151515 A1 | 9/2017 |
| WO | 2022256833 A1 | 12/2022 |

OTHER PUBLICATIONS

International Search Report and Written Opinion for corresponding International PCT Application No. PCT/ US2022/072743, dated Aug. 15, 2022.

*Primary Examiner* — Longbit Chai
(74) *Attorney, Agent, or Firm* — K&L Gates LLP (57) ABSTRACT

A method of enhancing network security across a plurality of tenants is disclosed herein. The method can include: providing a Security Information, and Event Management (SIEM) management application configured to be hosted by a SIEM provider server communicably coupled to a tenant server; coupling, via a data connector, the SIEM management application to a log source hosted by the tenant server, wherein the data connector is configured the control a flow of data to and from the log source; generating, via the SIEM management application, a JavaScript Object Notation (JSON) based solution bundle for the log source; visually (Continued)

displaying, via a user interface of the SIEM management application, a proposed SIEM protocol for the tenant server based, at least in part, on the JSON-based solution bundle; and deploying, via the SIEM management application, the proposed SIEM protocol from the SIEM provider server to the tenant server.

12 Claims, 5 Drawing Sheets

(58) Field of Classification Search
USPC .......................................................... 726/22
See application file for complete search history.

(56) References Cited

U.S. PATENT DOCUMENTS

| | | |
|---|---|---|
| 2019/0356679 A1* | 11/2019 | Sites ................... H04L 63/1416 |
| 2020/0186569 A1 | 6/2020 | Milazzo et al. |
| 2021/0117251 A1 | 4/2021 | Cristofi et al. |
| 2022/0247761 A1* | 8/2022 | Subbanna ........... H04L 63/1425 |

* cited by examiner

DEVICES, SYSTEMS, AND METHODS FOR STANDARDIZING AND STREAMLINING THE DEPLOYMENT OF SECURITY INFORMATION AND EVENT MANAGEMENT ARTIFACTS FOR MULTIPLE TENANTS

CROSS-REFERENCE TO RELATED APPLICATIONS

This application is a U.S. National Stage Entry under 35 U.S.C. § 371 of International Patent Application No. PCT/US2022/072743, filed Jun. 3, 2022, entitled DEVICES, SYSTEMS. AND METHODS FOR STANDARDIZING AND STREAMLINING THE DEPLOYMENT OF SECURITY INFORMATION AND EVENT MANAGEMENT ARTIFACTS FOR MULTIPLE TENANTS, which claims the benefit of priority under 35 U.S.C. § 119(e) to U.S. Provisional Patent Application No. 63/196,991, titled DEVICES, SYSTEMS, AND METHODS FOR STANDARDIZING & STREAMLINING THE DEPLOYMENT OF SECURITY INFORMATION & EVENT MANAGEMENT ARTIFACTS FOR MULTIPLE TENANTS, filed on Jun. 4, 2021, the disclosures of which are herein incorporated by reference in their entirety.

FIELD

The present disclosure is generally related to network security, and, more particularly, is directed to improved devices, systems, and methods for issuing Security Information, and Event Management (SIEM) client updates.

SUMMARY

The following summary is provided to facilitate an understanding of some of the innovative features unique to the aspects disclosed herein, and is not intended to be a full description. A full appreciation of the various aspects can be gained by taking the entire specification, claims, and abstract as a whole.

In various aspects, a method of enhancing network security across a plurality of tenants configured to host a plurality of client applications is disclosed. The method can include providing a Security Information, and Event Management (SIEM) management application configured to be hosted by a SIEM provider server, wherein the SIEM provider server is communicably coupled to a tenant server; coupling, via a data connector, the SIEM management application to a log source hosted by the tenant server, wherein the data connector is configured the control a flow of data to and from the log source; generating, via the SIEM management application, a JavaScript Object Notation (JSON) based solution bundle for the log source; visually displaying, via a user interface of the SIEM management application, a proposed SIEM protocol for the tenant server based, at least in part, on the JSON-based solution bundle; and deploying, via the SIEM management application, the proposed SIEM protocol from the SIEM provider server to the tenant server.

In various aspects, a system for enhancing network security is disclosed. The system can include: a display; a tenant server configured to host a data connector and a log source, wherein the data connector is configured the control the flow of data to and from the log source; and a Security Information, and Event Management (SIEM) provider server communicably coupled to the tenant server and the display, wherein the SIEM provider server is configured to store and execute an SIEM management application configured to cause the SIEM provider server to: couple the SIEM provider server to the data connector; generate a JavaScript Object Notation (JSON) based solution bundle for the log source; cause the display to visualize a user interface of the SIEM management application including a proposed SIEM protocol for the tenant server, wherein the SIEM protocol is based, at least in part, on the JSON-based solution bundle; and deploy the proposed SIEM protocol from the SIEM provider server to the tenant server.

In various aspects, a Security Information, and Event Management (SIEM) provider server communicably coupled to a tenant server and a display is disclosed. The SIEM provider server is configured to store and execute an SIEM management application configured to cause the SIEM provider server to: couple the SIEM provider server to the data connector; generate a JavaScript Object Notation (JSON) based solution bundle for a log source hosted by the tenant server; cause the display to visualize a user interface of the SIEM management application including a proposed SIEM protocol for the tenant server, wherein the SIEM protocol is based, at least in part, on the JSON-based solution bundle; and deploy the proposed SIEM protocol from the SIEM provider server to the tenant server.

These, and other objects, features, and characteristics of the present invention, as well as the methods of operation, and functions of the related elements of structure, and the combination of parts, and economies of manufacture, will become more apparent upon consideration of the following description, and the appended claims with reference to the accompanying drawings, all of which form a part of this specification, wherein like reference numerals designate corresponding parts in the various figures. It is to be expressly understood, however, that the drawings are for the purpose of illustration, and description only, and are not intended as a definition of the limits of the invention.

BRIEF DESCRIPTION OF THE DRAWINGS

Various features of the aspects described herein are set forth with particularity in the appended claims. The various aspects, however, both as to organization, and methods of operation, together with advantages thereof, may be understood in accordance with the following description taken in conjunction with the accompanying drawings as follows:

DETAILED DESCRIPTION

The Applicant of the present application owns the following U.S. Provisional Patent Applications, the disclosure of each of which is herein incorporated by reference in its entirety:

U.S. Provisional Patent Application No. 63/294,570 titled DEVICES, SYSTEMS, AND METHODS FOR PROVISIONING AND UPDATING SECURITY INFORMATION & EVENT MANAGEMENT ARTIFACTS FOR MULTIPLE TENANTS, filed on Dec. 29, 2021;

U.S. Provisional Patent Application No. 63/295,150 titled DEVICES, SYSTEMS, AND METHODS FOR STREAMLINING AND STANDARDIZING THE INGEST OF SECURITY DATA ACROSS MULTIPLE TENANTS, filed on Dec. 30, 2021;

U.S. Provisional Patent Application No. 63/302,828 titled DEVICES, SYSTEMS, AND METHODS FOR REMOTELY MANAGING ANOTHER ORGANIZATION'S SECURITY ORCHESTRATION, AUTOMATION, AND RESPONSE, filed on Jan. 25, 2022;

U.S. Provisional Patent Application No. 63/313,422 titled DEVICES, SYSTEMS, AND METHODS FOR IDENTIFYING CYBER ASSETS AND GENERATING CYBER RISK MITIGATION ACTION BASED ON DOMAIN REDIRECTS, filed on Feb. 24, 2022;

U.S. Provisional Patent Application No. 63/341,264 titled DEVICES, SYSTEMS, AND METHODS FOR SUMMARIZING ANALYTIC OBSERVATIONS, filed on May 12, 2022;

U.S. Provisional Patent Application No. 63/344,305 titled DEVICES, SYSTEMS, AND METHODS FOR INGESTING & ENRICHING SECURITY INFORMATION TO AUTONOMOUSLY SECURE A PLURALITY OF TENANT NETWORKS, filed on May 20, 2022;

U.S. Provisional Patent Application No. 63/345,679 titled DEVICES, SYSTEMS, AND METHODS FOR IDENTIFYING CYBER ASSETS AND GENERATING CYBER RISK MITIGATION ACTIONS BASED ON A DEMOCRATIC MATCHING ALGORITHM, filed on May 25, 2022; and International Patent Application No. PCT/2022/072739, titled DEVICES, SYSTEMS, AND METHODS FOR ENHANCING SECURITY INFORMATION & EVENT MANAGEMENT UPDATES FOR MULTIPLE TENANTS BASED ON CORRELATED, AND SYNERGISTIC DEPLOYMENT NEEDS, filed Jun. 3, 2022, the disclosure of which is herein incorporated by reference in its entirety.

Numerous specific details are set forth to provide a thorough understanding of the overall structure, function, manufacture, and use of the aspects as described in the disclosure, and illustrated in the accompanying drawings. Well-known operations, components, and elements have not been described in detail so as not to obscure the aspects described in the specification. The reader will understand that the aspects described, and illustrated herein are non-limiting aspects, and thus it can be appreciated that the specific structural, and functional details disclosed herein may be representative, and illustrative. Variations, and changes thereto may be made without departing from the scope of the claims. Furthermore, it is to be understood that such terms as "forward", "rearward", "left", "right", "upwardly", "downwardly", and the like are words of convenience, and are not to be construed as limiting terms.

In the following description, like reference characters designate like or corresponding parts throughout the several views of the drawings. Also in the following description, it is to be understood that such terms as "forward", "rearward", "left", "right", "upwardly", "downwardly", and the like are words of convenience, and are not to be construed as limiting terms.

Before explaining various aspects of the systems, and methods disclosed herein in detail, it should be noted that the illustrative aspects are not limited in application or use to the details of disclosed in the accompanying drawings, and description. It shall be appreciated that the illustrative aspects may be implemented or incorporated in other aspects, variations, and modifications, and may be practiced or carried out in various ways. Further, unless otherwise indicated, the terms, and expressions employed herein have been chosen for the purpose of describing the illustrative aspects for the convenience of the reader, and are not for the purpose of limitation thereof. For example, it shall be appreciated that any reference to a specific manufacturer, software suite, application, or development platform disclosed herein is merely intended to illustrate several of the many aspects of the present disclosure. This includes any, and all references to trademarks. Accordingly, it shall be appreciated that the devices, systems, and methods disclosed herein can be implemented to enhance any software update, in accordance with any intended use, and/or user preference.

As used herein, the term "server" may refer to or include one or more computing devices that are operated by or facilitate communication, and processing for multiple parties in a network environment, such as the Internet or any public or private network. Reference to "a server" or "a processor," as used herein, may refer to a previously-recited server, and/or processor that is recited as performing a previous step or function, a different server, and/or processor, and/or a combination of servers, and/or processors.

As used herein, the term "constant" may refer to one or more SIEM functions that remain unchanged during the issuance of an alert. For example, a constant can include an Azure Sentinel Log Analytics function, amongst others. According to some non-limiting aspects, a constant can be specifically configured in accordance with an individual client's preferences and/or requirements. For example, alert rules, as described herein, can be the same for all client deployments. However, the apparatuses, systems, and methods disclosed herein can employ client-specific constants to "fine tune" how alerts are managed for each particular client. In other words, each constant can include a whitelist of specific protocols, accounts, etc. which the alert rule manages those constants differently (e.g., skips them).

As used herein, the term "platform" shall include software and/or an ecosystem of physical resources required to enable the technological benefits provided by software. For example, a platform can include either a stand-alone software product, or a software product configured to integrate with other software or physical resources within the ecosystem required for the software to provide its technological benefit. According to some non-limiting aspects, the technological benefit provided by the software is provided to the physical resources of the ecosystem or other software employed by physical resources within the ecosystem (e.g., APIs, services, etc.). According to other non-limiting aspects, a platform can include a framework of several software applications intended and designed to work together.

As used herein, the term "network" shall include an entire enterprise information technology ("IT") system, as deployed by a tenant. For example, a network can include a group of two or more nodes (e.g., devices) connected by any physical and/or wireless connection and configured to communicate and share information with the other node or nodes. However, the term network shall not be limited to any particular nodes or any particular means of connecting those nodes. A network can include any combination of devices (e.g., servers, desktop computers, laptop computers, personal digital assistants, mobile phones, wearables, smart appliances, etc.) configured to connect to an ethernet, intranet, and/or extranet and communicate with one another via an ad hoc connection (e.g., Bluetooth®, near field communication ("NFC"), etc.), a local area connection ("LAN"), a wireless local area network ("WLAN"), and/or a virtual private network ("VPN"), regardless of each devices' physical location. A network can further include any tools, applications, and/or services deployed by devices, or otherwise utilized by an enterprise IT system, such as a firewall, an email client, document management systems, office systems, etc. In some non-limiting aspects, a "network" can include third-party devices, applications, and/or services that, although they are owned and controlled by a third party, are authorized by the tenant to access the enterprise IT system.

Security Information, and Event Management (SIEM) includes software configured to aggregate and analyze activity from many different resources across an entire information technology (IT) infrastructure. For example, SIEM can be implemented to aggregate data from multiple systems, and analyze that data to catch abnormal behavior or potential cyberattacks. For example, SIEM may collect security data from network devices, servers, domain controllers, and more. SIEM can be implemented to store, normalize, aggregate, and apply analytics to that data to discover trends, detect threats, and enable organizations to investigate any alerts. Although known SIEM tools offer impressive functionality, including the ability to monitor events, collect data, and issue security alerts across a network, such tools are typically tailored for an implementing organization, and—more specifically—a particular network architecture, which can oftentimes be complex. Accordingly, SIEM can be expensive, resource intensive, and often it may be difficult to resolve problems with SIEM data.

Examples of commonly implemented SIEMs include Azure Sentinel and Splunk Cloud, Devo, LogRhythm, IBM's QRadar, Securonix, McAfee Enterprise Security Manager, LogPoint, Elastic Stack, ArcSight Enterprise Security Manager, InsightIDR, amongst others. Deploying Azure Sentinel as a cloud-based tool, specifically, has become a popular choice amongst managed security service providers ("MSSPs") and therefore, Azure Sentinel will be discussed as a non-limiting example. However, it shall be appreciated that the other SIEMs are contemplated by the present disclosure. Like most SIEMs, deploying Azure Sentinel requires a high level of skill, and, at the same time, it could be very time consuming, and error prone. Each organization that needs a security solution has special needs around monitoring, and alerting, the log sources to ingest, the detection/alert rules, the response automation, reporting, etc. Although Microsoft (MSFT) is often used by MSSPs to manage multiple clients, the complexity of the initial configuration, deployment, and ongoing maintenance of artifacts (e.g., resource groups, log analytics workspaces, alert rules, workbooks, playbooks, etc.), has been increasing significantly. This can result in a high cost for both the MSSP—who must hire more expensive specialists—and for the client, who often bears at least a portion of the increasing expenses. However, there is often an overlap between some of the deployment needs of varying clients. For example, many organizations may require similar firewall monitoring solutions. In such instances, asset reuse, and re-deployment (and update) may lead to major cost reduction, and simplicity of operations. Unfortunately, known SIEM tools are technologically incapable of taking advantage of such synergies. Thus, from the initial provisioning, and throughout the automation of incident responses, MSSPs are left with limited re-use opportunities to capture efficiencies across multiple clients. Accordingly, there is a need for improved devices, systems, and methods to implement, and issuing SIEM client updates. Such enhancements could improve the technological performance, and cost effectiveness of SIEM, including the deployment of detection rules, visualizations, investigation workbooks, and ongoing maintenance.

Accordingly, there is a need for devices, systems, and methods that employ an automated, "as-a-service" approach to generate and deploy reusable pre-packaged solutions that can be executed in a single step, while delivering full, end-to-end SIEM solutions. Such devices, systems, and methods can deploy a Sentinel implementation with a click of a button with only a minimum understanding of SIEM (e.g., Sentinel, Azure, etc.). Accordingly, such devices, systems, and methods can be used to repeatedly scale cloud-based SIEM implementations with consistency. A user need only provide a location where the entire deployment would take place and/or login credentials for the respective client.

The present disclosure presents such devices, systems, and methods, all of which provide many technological benefits, which enable MSSPs to deploy, at scale, repeatedly, and consistently, cloud-based SIEM implementations, such as Azure Sentinel implementations, according to one non-limiting aspect. For example, the devices, systems, and methods disclosed herein can provide: (1) a means of dynamically plugging-in a JavaScript Object Notation ("JSON") based solution bundle descriptions of various Sentinel artifacts (e.g., resource groups, log analytics workspaces, data connectors, alert rules, playbooks, workbooks, etc.), which shall be referred to as a "SIEM-in-a-Box," herein; (2) a visual interface for an authorized user to select a desired SIEM-in-a-box bundle; (3) an action button to "deploy" the selected bundle to a user's desired SIEM subscription, essentially creating all the necessary artifacts (e.g., resource group, log analytics workspace, etc.), configuring appropriate data connectors (specific to the chosen bundle), and creating the analytics/alert rules needed for the solution, as well as any playbook, workbooks, queries, as needed by the particular bundled configuration; (4) Configures the back end service operating center (SOC) to onboard a new client, with well defined automation rules in response to the events triggered by the alerts/detections configured for the particular bundle; and (5) an MSSP/CSP model: a service provider who has access to their clients Azure environment (e.g., via Azure Lighthouse, etc.) can deploy bundles, on behalf of their clients, into each client workspace. Accordingly, the bundle provider only manages the relationship with the MSSP/CSP, with enough filtering by client workspace in responding to specific alerts/incidents. This could be important for the efficiency of billing, support, and avoiding unnecessary client interactions.

Not only are conventional MSSP devices, systems, and methods technologically incapable of automation, but it would be highly impractical—if not impossible—for an MSSP to manually continuously monitor hundreds, if not thousands, of tenant networks in real-time. The devices, systems, and methods disclosed herein are also technologically configured to be adaptable. In conjunction with being highly scalable, this adaptability enables and MSSP to track changes across a high volume of tenant deployments, monitor responses to those changes, and autonomously implement them for any applicable tenant deployment that could similarly benefit from them. In other words, conventional MSSP devices, systems, and methods are inherently more prone security events and thus, technologically less secure than the devices, systems, and methods disclosed herein.

Figure 1:
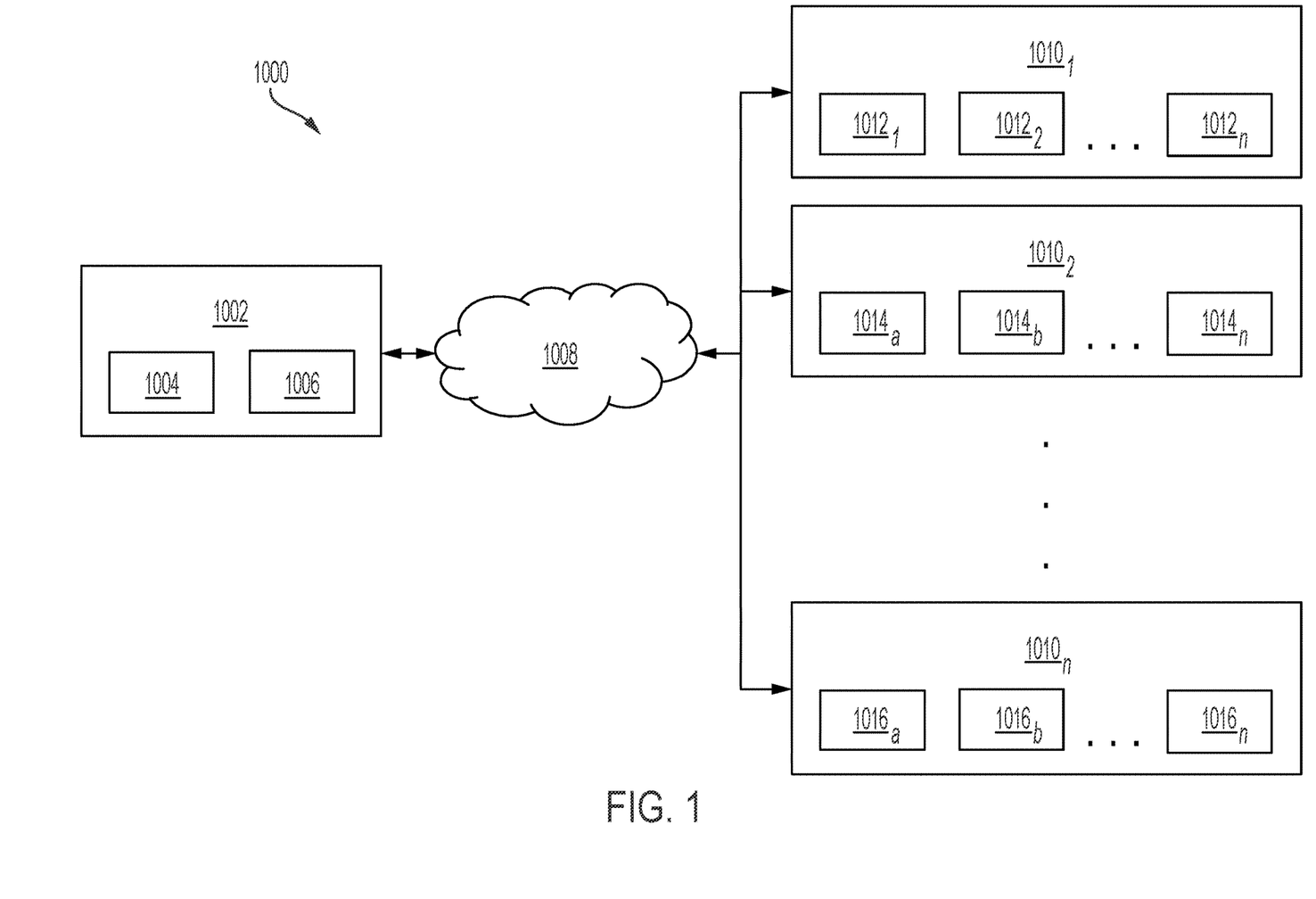
FIG. 1 illustrates a diagram of a system configured to standardize and streamline the deployment of Security Information, and Event Management (SIEM) artifacts for multiple tenants, in accordance with at least one non-limiting aspect of the present disclosure.

Referring now to FIG. 1, a diagram of a system 1000 configured to enhance SIEM updates is depicted in accordance with at least one non-limiting aspect of the present disclosure. According to the non-limiting aspect of FIG. 1, the system 1000 can include a SIEM provider server 1002 comprising a memory 1006 configured to store a SIEM management application 102, and a processor 1004 configured to execute the stored SIEM management application 102, as will be discussed in further reference to FIG. 2. For example, the SIEM provider server 1002 can be a computational resource either owned or leased by the MSSP. The SIEM provider server 1002 can be communicably coupled, via network 1008, to a plurality of tenants $1010a$, $1010b$ . . . $1010n$. Each tenant $1010_1$, $1010_2$ . . . $1010_n$, of the plurality can represent a customer (e.g., organization) contracting with the MSSP. According to the non-limiting aspect of FIG. 1, the network 1008 can include any variety of wired, long-range wireless, and/or short-range wireless networks. For example, the network 1008 can include an internal intranet, a Local Area Networks (LAN), WiFi®, cellular networks, near-field communication (hereinafter "NFC"), amongst others.

In further reference to FIG. 1, each tenant $1010_1$, $1010_2$ . . . $1010_n$ of the plurality can host one or more instances of one or more clients 1012, 1014, 1016. For example, a first tenant $1010_1$ can include one or more machines implementing one or more client applications $1012_1$, $1012_2$ . . . $1012_n$, a second tenant $1010_2$ can include one or more machines implementing one or more client applications $1014_1$, $1014_2$ . . . $1014_n$, and/or a third tenant $1010_n$ can include one or more machines implementing one or more client applications $1016_1$, $1016_2$ . . . $1016_n$. Each tenant $1010_1$, $1010_2$, and $1010_n$ can include an intranet by which each machine implementing the client applications For example, each tenant $1010_1$, $1010_2$, and $1010_n$ can each represent a customer, such as an organization, contracting with the MSSP for security services. Accordingly, the SIEM provider server 1002 can be configured to have oversight of each tenant $1010_1$, $1010_2$, and $1010_n$ of the plurality, and thus, is responsible for monitoring, and managing each client application 1012, 1014, 1016 for threats. As previously discussed, the differences, and complexity in tenant $1010_1$, $1010_2$, and $1010_n$ architecture can complicate this, and render it inefficient for the MSSP. Thus, known SIEM tools can leave the tenants $1010_1$, $1010_2$, and $1010_n$ technologically exposed, and thus, vulnerable to attacks. According to non-limiting aspects of the present disclosure, the SIEM provider server 1002 can implement a SIEM management application 102 that technologically, and practically addresses these deficiencies by enhancing the ability of the SIEM provider server 1002 to manage, and transmit alerts, and client application updates for multiple tenants based on correlated, and synergistic development needs.

Figure 2:
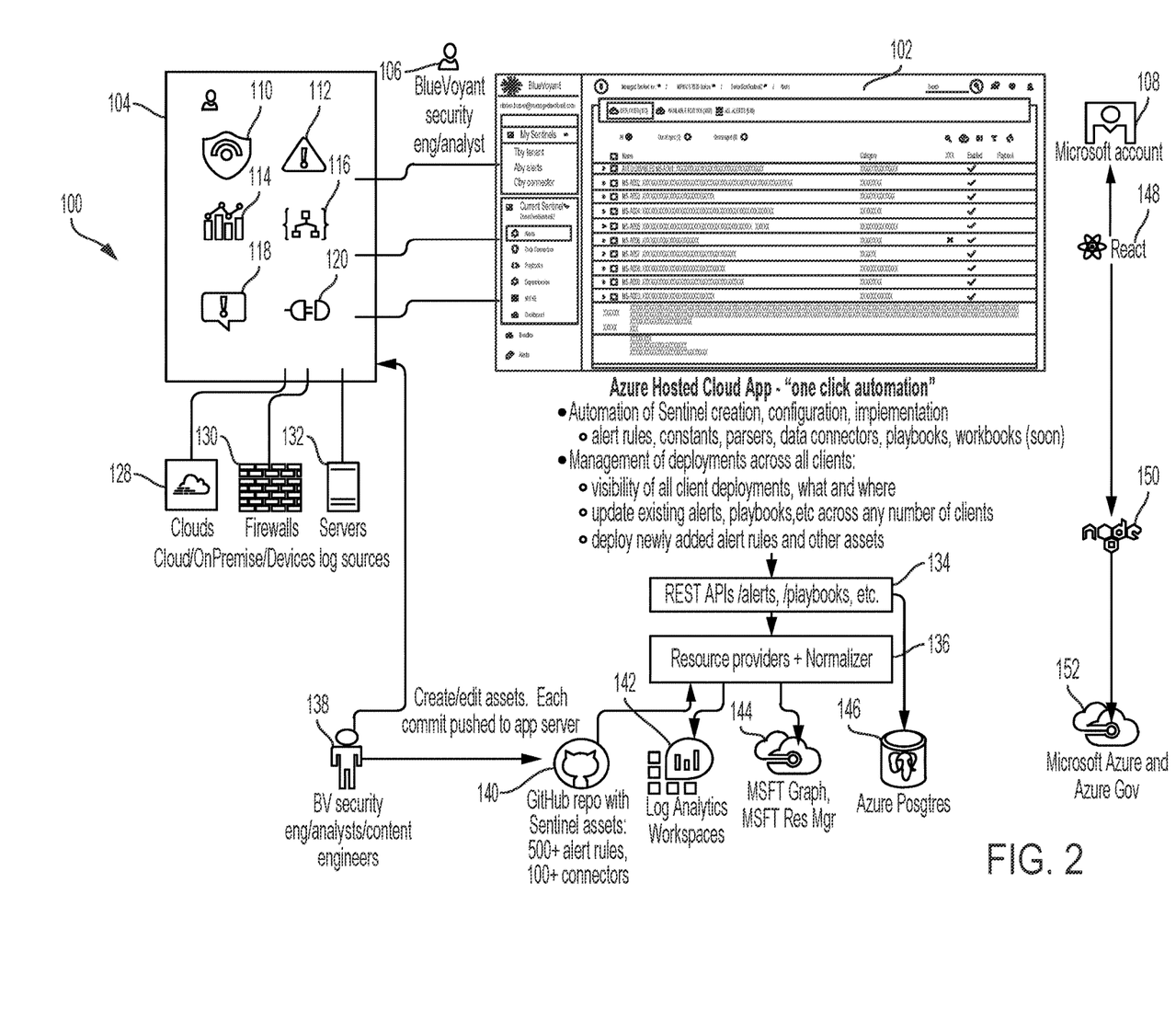
FIG. 2 illustrates a deployment diagram of the system of FIG. 1, including a SIEM management application, in accordance with at least one non-limiting aspect of the present disclosure.

Referring now to FIG. 2, a deployment diagram 100 of the system 1000 of FIG. 1, including a SIEM management application 102—or in other words, a visualization tool—is depicted in accordance with at least one non-limiting aspect of the present disclosure. It shall be appreciated that the deployment diagram of FIG. 2 includes visual widgets that correspond to various structural and/or functional elements of the system 1000 (FIG. 1). According to some non-limiting aspects, the system 100 of FIG. 2 can provide an integrated, visual environment that can allow the management of client deployments, including, for example: (1) a catalogue of various artifacts (e.g., alert rules, playbooks, workbook, etc.); (2) an ability to select desired artifacts, and deploy selected artifacts to a particular target Sentinel environment for a client with a single click; (3) an ability to visualize all client deployments-including current and out-of-date deployments (e.g., via alert rules indicating some deployments have newer versions that need to be deployed); and (4) an ability to visualize (e.g., color code) deployment status and to quickly deploy updates with the click of a button.

According to the non-limiting aspect of FIG. 2, the system 100 can be configured to provide SIEM services, security information management, and security event management to multiple tenants simultaneously, while providing real-time analysis of security alerts generated by applications, and network hardware. For example, the system 100 can be configured to execute a SIEM management application 102 running, for example, on a SIEM provider server 1002 (FIG. 1) in communication with one or more than one client applications 104, which—as previously discussed—can be hosted by one or more tenants servers $1010_1$, $1010_2$, $1010_n$ (FIG. 1). For example, according to one non-limiting aspect, the client application 104 can include a SIEM application 110 software configuration, and management to display, and/or deploy multiple alert rules, and constants 112 associated with one or more automation playbooks 116, deploy, monitor, and update workbooks 114 for dashboards, manage alert fine tuning via constants, and incidents 118. Additionally the system 1000 of FIG. 1 can include a mechanism for detecting, visualizing differences, and updating outdated alert rules 112 across one or more than one SIEM application 110 deployments, including SIEM applications 110 that are provided by other vendors. The SIEM management application 102 can be monitored by a security engineer/analyst 106. For example, according to one non-limiting aspect, the SIEM management application 102 can be implemented to monitor and manage an SIEM application 110 such as Azure Sentinel. However, it shall be appreciated that the SIEM management application 102 can be implemented to monitor and manage any number of SIEM applications 110, independent of Azure Sentinel.

In further reference to FIG. 2, the system 1000 (FIG. 1) can further include one or more than one client application interfaces 104 including, for example, various clouds 128, firewalls 130, and servers 132 through data connectors 120 configured to couple SIEM provider server 1002 (FIG. 1) to the one or more tenant servers 1010 (FIG. 1). For example, the data connector 120 can connect the SIEM management application 102—and more generally, the SIEM provider server 1000 (FIG. 1)—to various log (data) sources (e.g., Outlook, etc.) associated with a tenant server 1010 (FIG. 1). Accordingly, one or more users 138 (e.g., security engineers, analysts, content engineers, etc.) can interface with the client application interfaces 104 to create and/or edit artifacts.

Each artifact can be pushed to a tenant server 1010 (FIG. 1) via a data connector 120. As will be discussed herein, in some non-limiting aspects, one or more artifacts can be bundled and sent en masse to tenant servers 1010 (FIG. 1) with similar architectures. Additionally and/or alternately, the SIEM management application 102 can be configured to integrate with a third-party application server (not shown), such as for example, a content repository 140 (e.g., GitHub/ GitLab, etc.) that contains deployable artifact templates. Those skilled in the art will appreciate that GitHub can be used as a basic code repository, issue tracking, documentation, and wikis. Similar to GitHub, GitLab is a repository manager which lets teams collaborate on code, and may provide similar features for issue tracking, and project management as GitHub.

According to one non-limiting aspect, the content repository 140 may contain JSON files specifically configured to define alert rules, workbooks, playbooks, etc. for a particular tenant server 1010 (FIG. 1)—and more specifically, a particular tenant architecture. An example of one such JSON file 300 will be discussed in further reference to FIG. 3. Accordingly, the SIEM management application 102 can be configured to identify and/or collaborate with the content repository 140 to generate bundled JSON files 300 (FIG. 3) that define alert rules, workbooks, playbooks, etc. for a plurality tenant servers $1010_1$, $1010_2$ . . . $1010_n$ (FIG. 1) of a similar architecture. As will be discussed in further reference to FIG. 4, the SIEM management application 102 can subsequently display one or more user interfaces that enable an implementing user 138 (e.g., security engineers, analysts, content engineers, etc.) to review and push the bundle out to the a plurality tenant servers $1010_1$, $1010_2$ . . . $1010_n$ (FIG. 1) of a similar architecture.

Still referring to FIG. 2, as new content is added or updated to the JSON file, changes can be automatically pushed to the SIEM management application 102. In one aspect, the SIEM management application 102 may be configured as an Azure Sentinel Automation Portal (ASAP), for example. In one aspect, ASAP portal runtime software code can include server middleware that is responsible for processing the content from the content repository 140, the connections to the SIEM application 110, and other services, and services requests for the client application 104 to deploy, update, read, content from/to the SIEM application 110. In one aspect, the client application 104 provides a unified, simplified view of all client deployments, and ability to work with one or multiple clients 104 at the same time.

In summary, the SIEM management application 102 of FIG. 2 can allow a security analyst 106 to not only see everything that is deployed, but to make updates to a single artifact, in a single client 104, or to multiple artifacts, across multiple clients 104, with a simple interaction. Furthermore, because the SIEM management application 102 can be configured to identify and/or collaborate with the content repository 140 to generate bundled JSON files 300 for a plurality tenant servers $1010_1$, $1010_2$ . . . $1010_n$ (FIG. 1) of a similar architecture, the SIEM management application 102 can reduce the complexity of initial configuration, deployment, and ongoing maintenance of artifacts (e.g., resource groups, log analytics workspaces, alert rules, workbooks, playbooks, etc.). In other words, a user can configure artifacts and deploy them to a number of tenant servers $1010_1$, $1010_2$ . . . $1010_n$ (FIG. 1) with the click of a button. Thus, the system 1000 (FIG. 1) can provide an automated, "as-a-service" approach to generate and deploy reusable pre-packaged solutions that can be executed in a single step, while delivering full, end-to-end SIEM solutions. This functionality allows an MSSP to scale to hundreds, and thousands of clients 104, with minimal staff, and minimal skills required. Content produced or updated, such as a new alert rule 112 to validate a new malware presence, can immediately be pushed to all clients 102. Additionally, in one aspect, many of these operations can be automated on a schedule.

In further reference to the non-limiting aspect of FIG. 2, the SIEM management application 102 can indicate all changes, for example, what has been deployed versus what is new or updated in the content repository 140, for each client 104 SIEM application 110, assess what the changes were, and push the changes, updates or new artifacts, very quickly. Additionally, in some non-limiting aspects, the user interface commands that perform the various deployments can be captured as scripts, checked into a client's 104 repository for validation, and automatically deployed at a predetermined time. According to some non-limiting aspects, the hosted cloud SIEM management application 102 can provide a "one click automation" feature. For example, the SIEM management application 102 can automate the creation of SIEM applications 110, configuration, and implementation, including alert rules 112, constants, parsers, data connectors 120, playbooks 116, workbooks 114, and the like. In one aspect, the SIEM management application 102 also provides management of deployment across all clients 104. The SIEM management application 102 provides visibility of all client 104 deployments, what, and where, update existing alerts 112, playbooks 116, etc. across nay number of clients 104, and deploy newly added alert rules 112, and other assets.

The SIEM management application 102 enables 134 one click automation for REST APIs, alerts 112, playbooks 116, etc. Those skilled in the art will appreciate that a REST API, also known as RESTful API, is an application programming interface (API or web API) that conforms to the constraints of REST architectural style, and allows for interaction with RESTful web services. An API (Application Programming Interface) is a set of definitions, and protocols for building, and integrating application software. The SIEM management application 102 provides real time data integration of REST APIs, alerts 112, playbooks 116, etc. to a flexible server relational cloud database 146 service, such as an Azure Postgres SQL database, for example.

The SIEM management application 102 interfaces with resource providers, and normalizer 136. The resource providers, and normalizer 136 interface with log analytics workspaces 142, Microsoft Graph, and Microsoft resource manager 144. The system 1000 (FIG. 1) also includes Microsoft Azure, and Azure Government 152, a mission-critical cloud, delivers breakthrough innovation to US government customers, and their partners accessible only to US federal, state, local, and tribal governments, and their partners, with operations controlled by screened US citizens. The Microsoft Azure, and Azure Government 152 interfaces to node 150. React 148 provides interactive UIs to the account 108. Still with reference to FIG. 2, in one aspect, the SIEM management application 102 provides a quick view across all deployments, and status, plus the ability to act on them directly where a given alert is deployed, and its state.

Figure 3:
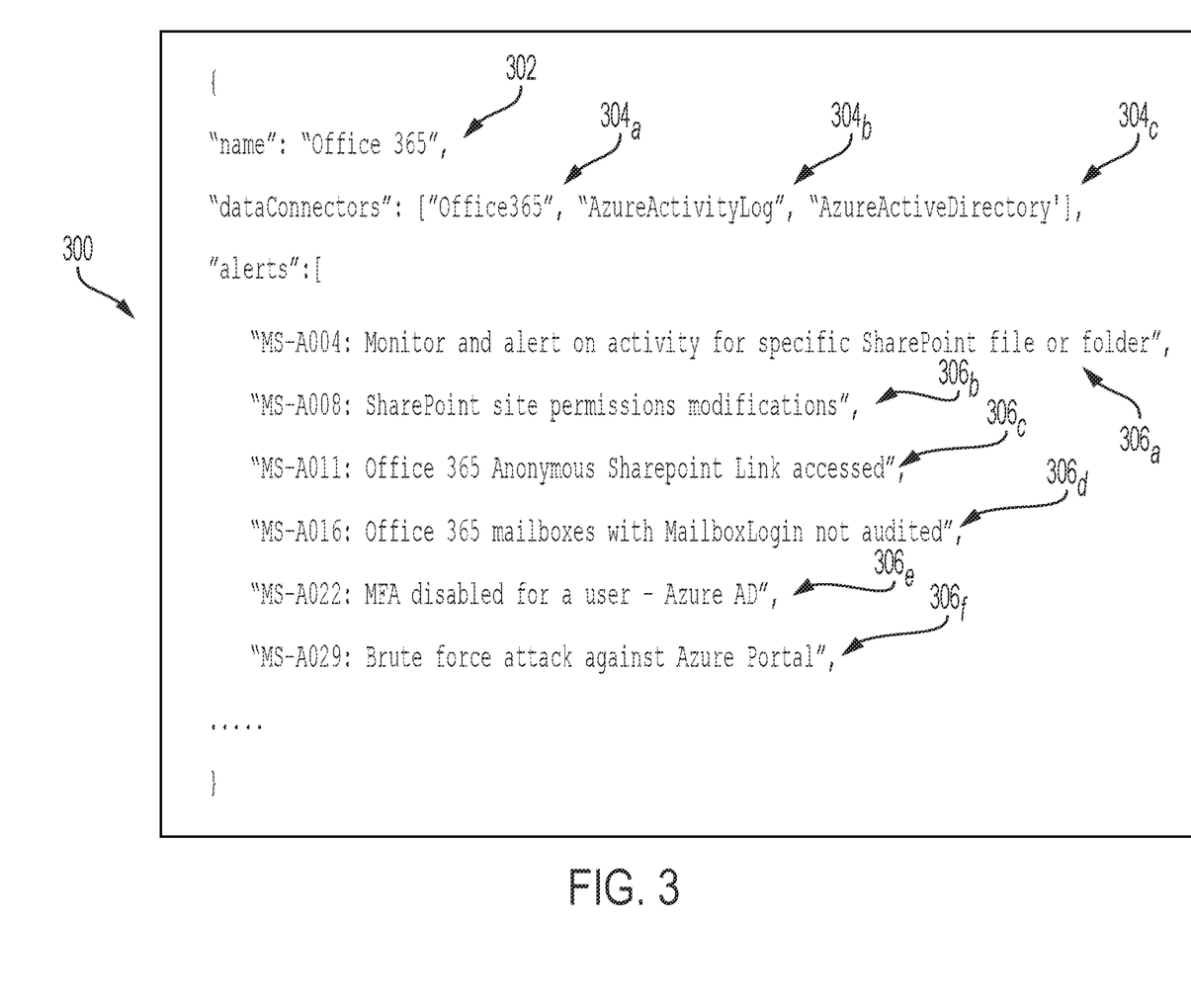
FIG. 3 illustrates a bundle file generated by the system of FIG. 1, in accordance with at least one non-limiting aspect of the present disclosure.

Referring now to FIG. 3, a bundle file 300 generated by the system 1000 of FIG. 1 is depicted in accordance with at least one non-limiting aspect of the present disclosure. According to the non-limiting aspect of FIG. 3, the bundle file 300 can be presented in a JSON format and configured for dynamically integration with the SIEM management application 102 of FIG. 2, including various artifacts (e.g., data connectors, alert rules, playbooks, workbooks, etc.). In other words, the bundle file 300 can define—and be easily deployed as-a "SIEM-in-a-Box," per se. In other words, upon deployment, the bundle file 300 of FIG. 3 can create all of the necessary SIEM artifacts for a corresponding data connector 120 (FIG. 2) (specific to the chosen bundle).

According to the non-limiting aspect of FIG. 3, the bundle file 300 can include various fields that are ether predetermined and/or autonomously generated by the SIEM management application 102 (FIG. 2). For example, according to the non-limiting aspect of FIG. 3, the bundle file 300 can a log source identifier 302, such as "Outlook 365." In other words, the bundle file 300 of FIG. 3, when deployed, will implement and/or update one or more SIEM artifacts governing the security of data associated with Outlook 365. The bundle file 300 of FIG. 3 can further include one or more data connector identifiers 302a-c such as "Office 365," "AzureActivityLog," and "AzureActiveDirectory." Furthermore, the bundle file 300 of FIG. 3 can include one or more artifact identifiers $304_{a-f}$, which, as previously discussed, can manage the SIEM activities and events that occur in association with the identified log source 302. For example, according to the non-limiting aspect of FIG. 3 the one or more artifact identifiers $304_{a-f}$ can include a plurality of alerts to be issued in associated with certain SIEM events.

In further reference to FIG. 3, according to other non-limiting aspects, the artifact identifiers $304_{a-f}$—and more generally, the bundle file 300—can be defined in accordance with a predetermined template stored on the content repository 140 (FIG. 2). For example, according to some non-limiting aspects, the artifact identifiers $304_{a-f}$ can collectively define a playbook, or a collection of procedures that can be run by the SIEM management application 102 (FIG. 2) in response to a particular alert or incident. In still other non-limiting aspects, the artifact identifiers $304_{a-f}$ can be defined in accordance with a workbook, or a large pool of possibilities for SIEM management of the identified log source 302. Such workbooks can range from data presentation and formatting to complex graphing and investigative maps for resources. According to still other non-limiting aspects, the artifact identifiers $304_{a-f}$ can be defined in accordance with a particular resource group and/or log analytics workspace.

Still referring to the non-limiting aspect of FIG. 3, artifact identifiers 304e corresponds to a particular alert rule MS-A022, which is associated with an Azure Active Directory data connector, and will automatically be deployed. The bundle file 300 of FIG. 3 exonerates a user from having to list any alerts, as the SIEM management application 102 (FIG. 2) and/or the content repository 140 (FIG. 2) automatically populate artifact identifiers $304_{a-f}$ for the specified data connector $304_b$. Thus, the non-limiting aspect of FIG. 3 highlights the flexibility of the bundle files 300 generated by the SIEM management application 102 (FIG. 2) and/or system 1000 (FIG. 1).

It shall be appreciated that the bundle file 300 of FIG. 3 can be generically deployed based on high-level architecture features for a particular tenant, such as a particular data connector 120 (FIG. 2) and/or a particular log source. The bundle files 300 thus, represent a technological improvement over known automation practices, which embrace a "deployment as code" approach. Known processes require complex scripts for automation, which frequently require tenant-specific changes prior to deployment. Contrarily, the bundle file 300 affords users "one click," end-to-end deployment without need for manual intervention. Even more so, the bundle file 300 of FIG. 3 enables an end to end deployment capable of spanning any SIEM environment (e.g., SOC, MDR, etc.). The bundle file 300 requires on scripts, and merely requires a user to define a desired state, APIs, and code logic for deployment. Additionally, several deployment bundles 300 can be displayed via the SIEM management application 102 (FIG. 2) for user selection. In other words, the SIEM management application 102 (FIG. 2) can automatically identify, generate, port, and/or deploy the appropriate artifact identifiers $304_{a-f}$ for a particular data connector 120 (FIG. 2), log source, and/or tenant server 1010 (FIG. 1), based on tenant architecture. This greatly reduces the amount of architecture or tenant-specific work necessary to configure SIEM management processes.

Figure 4:
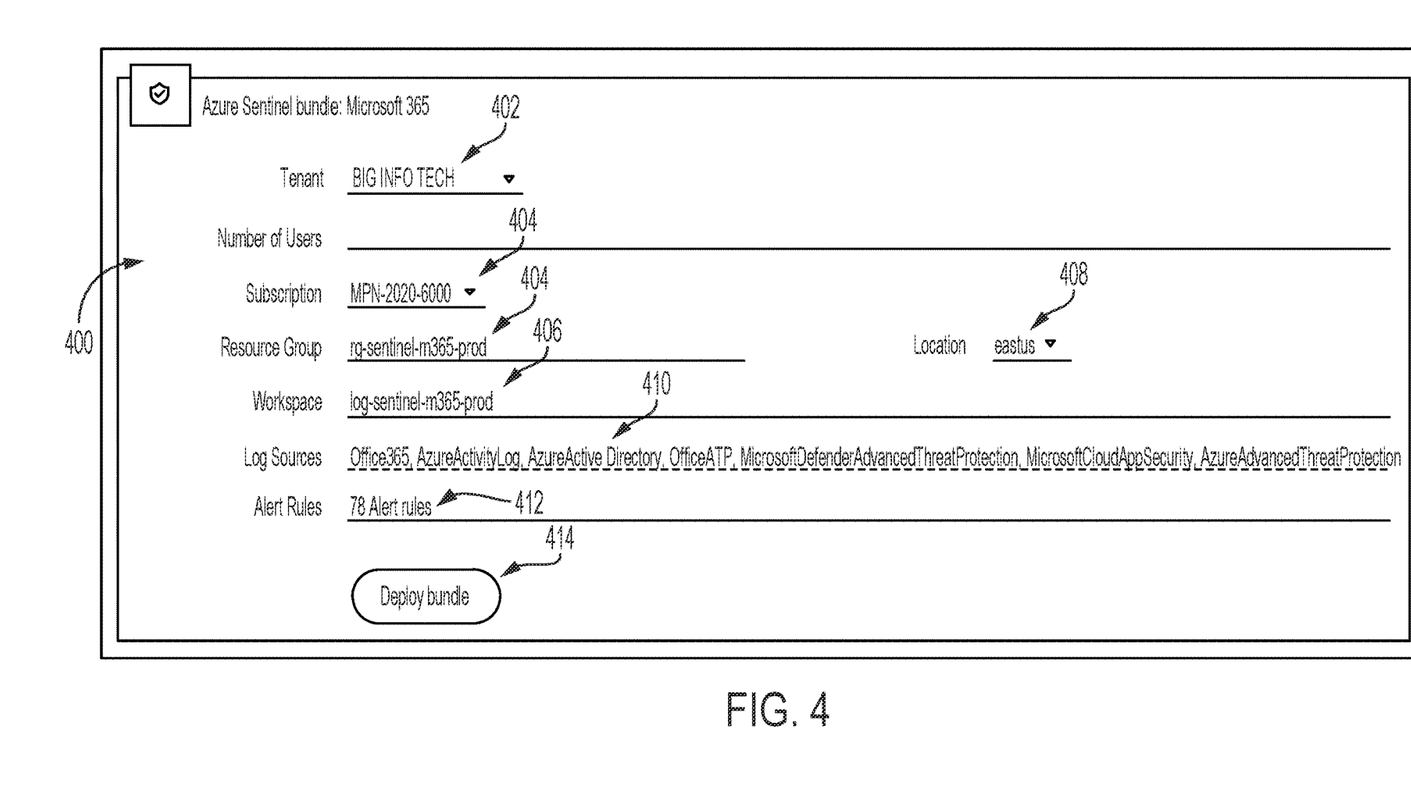
FIG. 4 illustrates a graphical user interface of the SIEM management application of FIG. 2 for the deployment of the bundle file of FIG. 3, in accordance with several non-limiting aspect of the present disclosure.

Referring now to FIG. 4, a graphical user interface 400 of the SIEM management application 102 of FIG. 2 for the deployment of the bundle file 300 of FIG. 3 is depicted in accordance with at least one non-limiting aspect of the present disclosure. According to the non-limiting aspect of FIG. 4, the graphical user interface 400 can be displayed when the user 106 (FIG. 2) (e.g., engineer, analyst, etc.) selects a bundle file for deployment, such as the bundle file 300 of FIG. 3. The user interface 400 can subsequently present an SIEM protocol to the user based, at least in part, on the selected bundle file 300 (FIG. 3). According to the user interface 400 of FIG. 4, the user can choose and/or load preselected (e.g., default) variables associated with the desired tenant environment. In some non-limiting aspects, the variables 402, 404, 406 can collectively define the SIEM protocol solution. For example, the user interface 400 can prompt the user to review a tenant name 402, a subscription type 404, a resource group 404, a workspace 406, one or more log sources 410, and/or a number of alert rules 412. According to some non-limiting aspects, the user interface 400 can propose two or more SIEM protocols based, at least in part, on the selected bundle file 300 (FIG. 3). In other words, the user interface 400 can present the user with several "SIEM-in-a-Box" options for the data connector 120 (FIG. 2). Once the user is satisfied with the variables associated with the desired tenant environment, they may engage (e.g., click, select, etc.) a "Deploy Bundle" widget 414 of the user interface 400, which will deploy the bundle file 300 (FIG. 4), including all of its artifacts $304_{a-f}$ to the selected data connector 120 associated with a log source of the desired tenant server 1010 (FIG. 1).

Figure 5:
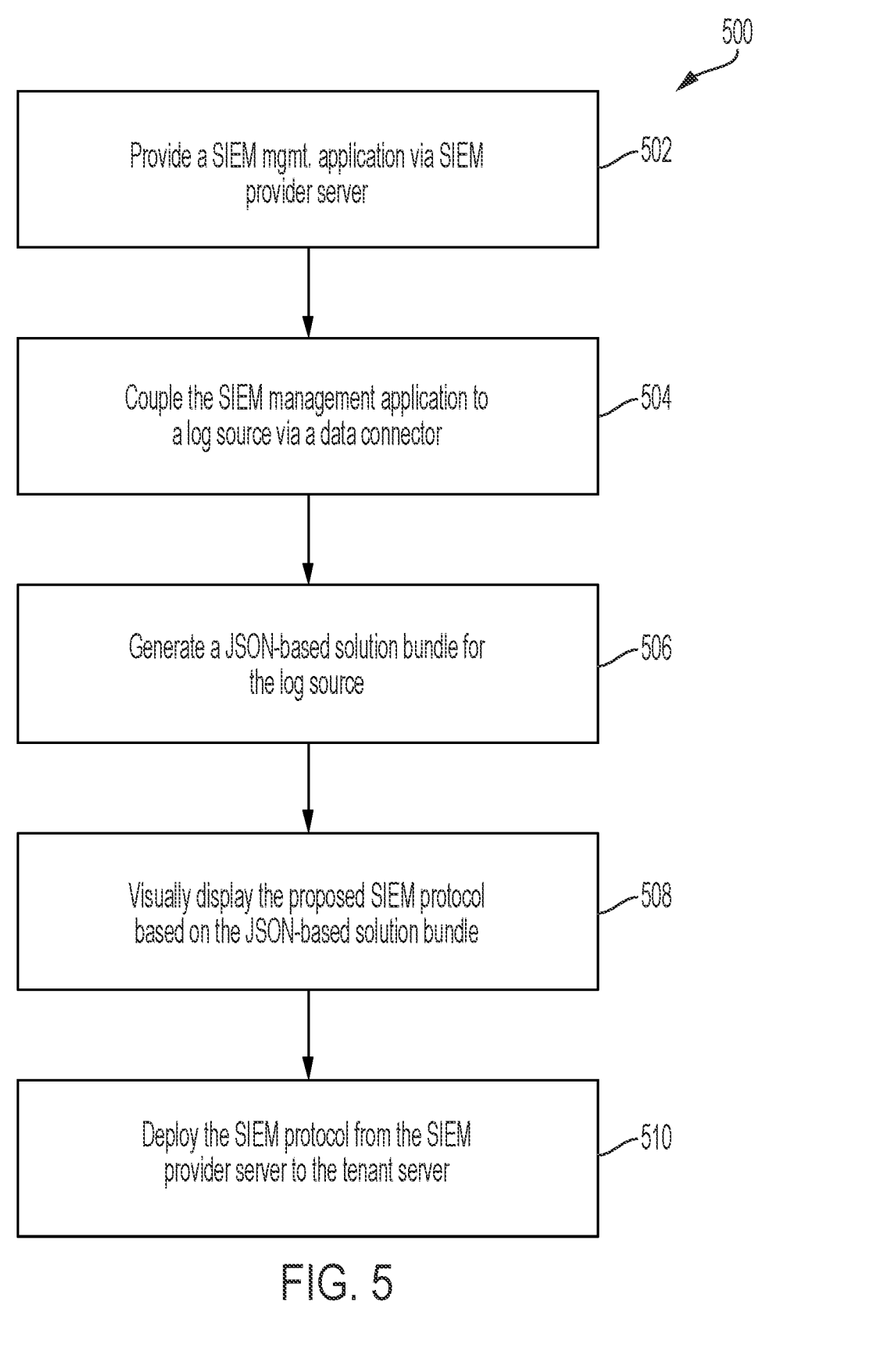
FIG. 5 illustrates a method of standardizing and streamlining the deployment of SIEM artifacts for multiple tenants, in accordance with several non-limiting aspect of the present disclosure; and Corresponding reference characters indicate corresponding parts throughout the several views. The exemplifications set out herein illustrate various aspects of the invention, in one form, and such exemplifications are not to be construed as limiting the scope of the invention in any manner.

Referring now to FIG. 5, a method 500 of standardizing and streamlining the deployment of SIEM artifacts for multiple tenants is depicted in accordance with at least one non-limiting aspect of the present disclosure. According to the non-limiting aspect of FIG. 11, the method can generate and present one or more SIEM protocol solutions based on a JSON-based solution bundle for quick and easy deployment to a tenant server 1010 (FIG. 1). The method 500 can include providing a Security Information, and Event Management (SIEM) management application configured to be hosted by a SIEM provider server, wherein the SIEM provider server is communicably coupled to a tenant server, at step 502. The method 500 can further include coupling, via a data connector, the SIEM management application to a log source hosted by the tenant server, wherein the data connector is configured the control a flow of data to and from the log source, at step 504. At step 506, the method 500 can include generating, via the SIEM management application, a JavaScript Object Notation (JSON) based solution bundle for the log source. The method 500 then calls for displaying, via a user interface of the SIEM management application, a proposed SIEM protocol for the tenant server based, at least in part, on the JSON-based solution bundle, at step 508. Finally, at step 510, the method 500 can include deploying, via the SIEM management application, the proposed SIEM protocol from the SIEM provider server to the tenant server.

Various aspects of the subject matter described herein are set out in the following numbered clauses:

Clause 1: A method of enhancing network security across a plurality of tenants configured to host a plurality of client applications, the method including: providing a Security Information, and Event Management (SIEM) management application configured to be hosted by a SIEM provider server, wherein the SIEM provider server is communicably coupled to a tenant server; coupling, via a data connector, the SIEM management application to a log source hosted by the tenant server, wherein the data connector is configured the control a flow of data to and from the log source; generating, via the SIEM management application, a JavaScript Object Notation (JSON) based solution bundle for the log source; visually displaying, via a user interface of the SIEM management application, a proposed SIEM protocol for the tenant server based, at least in part, on the JSON-based solution bundle; and deploying, via the SIEM management application, the proposed SIEM protocol from the SIEM provider server to the tenant server.

Clause 2: The method according to clause 1, wherein the proposed bundle includes a plurality of SIEM artifacts configured to govern how the data connector controls the flow of data to and from the log source.

Clause 3: The method according to clauses 1 or 2, further including generating, via the SIEM management application, at least one of the plurality of SIEM artifacts.

Clause 4: The method according to any of clauses 1-3, further including configuring the data connector based, at least in part, on the generated SIEM artifact.

Clause 5: The method according to any of clauses 1-4, wherein configuring the data connector is autonomously performed by the SIEM provider server.

Clause 6: The method according to any of clauses 1-5, wherein the plurality of SIEM artifacts includes at least one of a resource group, a log analytics workspace, a playbook, and a workbook, or combinations thereof.

Clause 7: The method according to any of clauses 1-6, wherein at least one SIEM artifact of the plurality includes a plurality of alert rules configured to govern how the data connector controls the flow of data to and from the log source.

Clause 8: The method according to any of clauses 1-7, wherein the proposed SIEM protocol for the tenant server is a first proposed SIEM protocol of a plurality of proposed SIEM protocols generated based, at least in part, on the JSON-based solution bundle, and wherein the method further includes visually displaying, via a user interface of the SIEM management application, the plurality of proposed SIEM protocols.

Clause 9: The system according to any of clauses 1-8, wherein deploying the proposed SIEM protocol from the SIEM provider server to the tenant server is based, at least in part, on a user selection of the proposed SIEM protocol from the plurality of proposed SIEM protocols.

Clause 10: The system according to any of clauses 1-9, wherein the tenant server is a first tenant server of a plurality of tenant servers communicably coupled to the SIEM provider server, wherein the proposed solution bundle is common to at least a subset of the plurality of tenant servers, and wherein the method further includes aggregating, via the SIEM management application, the plurality of tenant servers into workspaces based, at least in part, on the common solution bundle.

Clause 11: The method according to any of clauses 1-10, wherein deploying the proposed SIEM protocol further includes deploying the proposed SIEM protocol from the SIEM provider server to each tenant server of the subset of the plurality of tenant servers.

Clause 12: A system for enhancing network security, the system including: a display; a tenant server configured to host a data connector and a log source, wherein the data connector is configured the control the flow of data to and from the log source; and a Security Information, and Event Management (SIEM) provider server communicably coupled to the tenant server and the display, wherein the SIEM provider server is configured to store and execute an SIEM management application configured to cause the SIEM provider server to: couple the SIEM provider server to the data connector; generate a JavaScript Object Notation (JSON) based solution bundle for the log source; cause the display to visualize a user interface of the SIEM management application including a proposed SIEM protocol for the tenant server, wherein the SIEM protocol is based, at least in part, on the JSON-based solution bundle; and deploy the proposed SIEM protocol from the SIEM provider server to the tenant server.

Clause 13: The system according to clause 12, wherein the proposed bundle includes a plurality of SIEM artifacts configured to govern how the data connector controls the flow of data to and from the log source.

Clause 14: The system according to either of clauses 12 or 13, wherein the SIEM management application is further configured to cause the SIEM provider server to generate at least one of the plurality of SIEM artifacts.

Clause 15: The system according to any of clauses 12-14, wherein the SIEM management application is further configured to cause the SIEM provider server to configure the data connector based, at least in part, on the generated SIEM artifact.

Clause 16: The system according to any of clauses 12-15, wherein the SIEM management application is further configured to cause the SIEM provider server to autonomously configure the data connector.

Clause 17: The system according to any of clauses 12-16, wherein the plurality of SIEM artifacts includes at least one of a resource group, a log analytics workspace, a playbook, and a workbook, or combinations thereof.

Clause 18: The system according to any of clauses 12-17, wherein at least one SIEM artifact of the plurality includes a plurality of alert rules configured to govern how the data connector controls the flow of data to and from the log source.

Clause 19: The system according to any of clauses 12-18, wherein the proposed SIEM protocol for the tenant server is a first proposed SIEM protocol of a plurality of proposed SIEM protocols generated based, at least in part, on the JSON-based solution bundle, and wherein the method further includes visually displaying, via a user interface of the SIEM management application, the plurality of proposed SIEM protocols.

Clause 20: The system according to any of clauses 12-19, wherein deploying the proposed SIEM protocol from the SIEM provider server to the tenant server is based, at least in part, on a user selection of the proposed SIEM protocol from the plurality of proposed SIEM protocols.

Clause 21: A Security Information, and Event Management (SIEM) provider server communicably coupled to a tenant server and a display, wherein the SIEM provider server is configured to store and execute an SIEM management application configured to cause the SIEM provider server to: couple the SIEM provider server to the data connector; generate a JavaScript Object Notation (JSON) based solution bundle for a log source hosted by the tenant server; cause the display to visualize a user interface of the SIEM management application including a proposed SIEM protocol for the tenant server, wherein the SIEM protocol is based, at least in part, on the JSON-based solution bundle; and deploy the proposed SIEM protocol from the SIEM provider server to the tenant server.

Clause 22: The SIEM provider server according to clause 1, wherein the proposed bundle includes a plurality of SIEM artifacts configured to govern how a data connector controls the flow of data to and from the log source.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference, and the disclosure expressly set forth in the present application controls.

Various exemplary, and illustrative aspects have been described. The aspects described herein are understood as providing illustrative features of varying detail of various aspects of the present disclosure; and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the claimed subject matter. In addition, persons skilled in the art will recognize, or be able to ascertain using no more than routine experimentation, many equivalents to the various aspects of the present disclosure upon review of this specification. Thus, the present disclosure is not limited by the description of the various aspects, but rather by the claims.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one", and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one", and indefinite articles such as "a" or "an" (e.g., "a", and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A, and B together, A, and C together, B, and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A, and B together, A, and C together, B, and C together, and/or A, B, and C together, etc.). It will be further understood by those within the art that typically a disjunctive word, and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A, and B."

With respect to the appended claims, those skilled in the art will appreciate that recited operations therein may generally be performed in any order. Also, although claim recitations are presented in a sequence(s), it should be understood that the various operations may be performed in other orders than those which are described, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification,", and the like means that a particular feature, structure, or characteristic described in connection with the aspect is included in at least one aspect. Thus, appearances of the phrases "in one aspect," "in an aspect," "in an exemplification,", and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Directional phrases used herein, such as, for example, and without limitation, top, bottom, left, right, lower, upper, front, back, and variations thereof, shall relate to the orientation of the elements shown in the accompanying drawing, and are not limiting upon the claims unless otherwise expressly stated.

The terms "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced, and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits, and by applying ordinary rounding techniques.

Any numerical range recited herein includes all subranges subsumed within the recited range. For example, a range of "1 to 100" includes all sub-ranges between (and including) the recited minimum value of 1, and the recited maximum value of 100, that is, having a minimum value equal to or greater than 1, and a maximum value equal to or less than 100. Also, all ranges recited herein are inclusive of the end points of the recited ranges. For example, a range of "1 to 100" includes the end points 1, and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification, and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material, and the existing disclosure material.

The terms "comprise" (and any form of comprise, such as "comprises", and "comprising"), "have" (and any form of have, such as "has", and "having"), "include" (and any form of include, such as "includes", and "including"), and "contain" (and any form of contain, such as "contains", and "containing") are open-ended linking verbs. As a result, a system that "comprises," "has," "includes" or "contains" one or more elements possesses those one or more elements, but is not limited to possessing only those one or more elements. Likewise, an element of a system, device, or apparatus that "comprises," "has," "includes" or "contains" one or more features possesses those one or more features, but is not limited to possessing only those one or more features.

The foregoing detailed description has set forth various forms of the devices, and/or processes via the use of block diagrams, flowcharts, and/or examples. Insofar as such block diagrams, flowcharts, and/or examples contain one or more functions, and/or operations, it will be understood by those within the art that each function, and/or operation within such block diagrams, flowcharts, and/or examples can be implemented, individually, and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry, and/or writing the code for the software, and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

As used in any aspect herein, the term "control circuit" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein, "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes, and/or devices described herein, or a microprocessor configured by a computer program which at least partially carries out processes, and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware, and/or circuitry configured to perform any of the aforementioned operations. Software may be embodied as a software package, code, instructions, instruction sets, and/or data recorded on non-transitory computer readable storage medium. Firmware may be embodied as code, instructions or instruction sets, and/or data that are hard-coded (e.g., nonvolatile) in memory devices.

As used in any aspect herein, the terms "component," "system," "module", and the like can refer to a computer-related entity, either hardware, a combination of hardware, and software, software, or software in execution.

As used in any aspect herein, an "algorithm" refers to a self-consistent sequence of steps leading to a desired result, where a "step" refers to a manipulation of physical quantities, and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These, and similar terms may be associated with the appropriate physical quantities, and are merely convenient labels applied to these quantities, and/or states.

What is claimed is:

1. A method of enhancing network security across a plurality of tenants configured to host a plurality of client applications, the method comprising:
   providing a Security Information, and Event Management (SIEM) management application configured to be hosted and executed by a SIEM provider server, wherein the SIEM provider server is communicably coupled to a tenant server of a plurality of tenant servers;
   coupling, via a data connector, the SIEM management application to a log source hosted by the tenant server, wherein the data connector is configured the control a flow of data to and from the log source;
   generating, via the SIEM management application, a JavaScript Object Notation (JSON) based solution bundle for the log source;
   visually displaying, via a user interface of the SIEM management application, a proposed SIEM protocol for the tenant server based, at least in part, on the generated JSON-based solution bundle, wherein the proposed solution bundle comprises a plurality of SIEM artifacts configured to govern how the data connector controls the flow of data to and from the log source and wherein the proposed solution bundle is common to at least a subset of the plurality of tenant servers; and
   deploying, via the SIEM management application, the proposed SIEM protocol from the SIEM provider server to the tenant server of the plurality of tenant servers.

2. The method of claim 1, further comprising generating, via the SIEM management application, at least one of the plurality of SIEM artifacts.

3. The method of claim 2, further comprising configuring the data connector based, at least in part, on the generated SIEM artifact.

4. The method of claim 2, wherein configuring the data connector is autonomously performed by the SIEM provider server.

5. The method of claim 1, wherein the plurality of SIEM artifacts comprises at least one of a resource group, a log analytics workspace, a playbook, and a workbook, or combinations thereof.

6. The method of claim 5, wherein at least one SIEM artifact of the plurality comprises a plurality of alert rules configured to govern how the data connector controls the flow of data to and from the log source.

7. A system for enhancing network security, the system comprising:
   at least one hardware processors;
   a display;
   a tenant server of a plurality of tenant servers configured to host a data connector and a log source, wherein the data connector is configured the control the flow of data to and from the log source; and
   a Security Information, and Event Management (SIEM) provider server communicably coupled to the tenant server and the display, wherein the SIEM provider server is configured to store and execute an SIEM management application configured to cause the SIEM provider server to:
   couple the SIEM provider server to the data connector;
   generate a JavaScript Object Notation (JSON) based solution bundle for the log source;
   cause the display to visualize a user interface of the SIEM management application comprising a proposed SIEM protocol for the tenant server, wherein the SIEM protocol is based, at least in part, on the generated JSON-based solution bundle, and wherein the proposed solution bundle comprises a plurality of SIEM artifacts configured to govern how the data connector controls the flow of data to and from the log source and wherein the proposed solution bundle is common to at least a subset of the plurality of tenant servers; and
   deploy the proposed SIEM protocol from the SIEM provider server to the tenant server of the plurality of tenant servers.

8. The system of claim 7, wherein the SIEM management application is further configured to cause the SIEM provider server to generate at least one of the plurality of SIEM artifacts.

9. The system of claim 8, wherein the SIEM management application is further configured to cause the SIEM provider server to configure the data connector based, at least in part, on the generated SIEM artifact.

10. The system of claim 9, wherein the SIEM management application is further configured to cause the SIEM provider server to autonomously configure the data connector.

11. The system of claim 7, wherein the plurality of SIEM artifacts comprises at least one of a resource group, a log analytics workspace, a playbook, and a workbook, or combinations thereof.

12. The system of claim 11, wherein at least one SIEM artifact of the plurality comprises a plurality of alert rules configured to govern how the data connector controls the flow of data to and from the log source.

\* \* \* \* \*